(12) United States Patent
Orr (10) Patent No.: US 10,210,774 B2
(45) Date of Patent: Feb. 19, 2019

(54) SYSTEM AND METHOD FOR SIMULATING ARTERIAL PRESSURE PULSES (71) Applicant: Dynasthetics, LLC, Salt Lake City, UT (US)

(72) Inventor: Joseph Orr, Salt Lake City, UT (US)

(73) Assignee: Dynasthetics, LLC, Salt Lake City, UT (US)

( * ) Notice: Subject to any disclaimer, the term of this patent is extended or adjusted under 35 U.S.C. 154(b) by 149 days.

(21) Appl. No.: 15/354,535

(22) Filed: Nov. 17, 2016

(65) Prior Publication Data

US 2018/0137785 A1    May 17, 2018

(51) Int. Cl.
G09B 23/30    (2006.01)
G09B 23/32    (2006.01)
G09B 5/00    (2006.01)

(52) U.S. Cl.
CPC ............ *G09B 23/303* (2013.01); *G09B 5/00* (2013.01); *G09B 23/32* (2013.01)

(58) Field of Classification Search
None
See application file for complete search history.

(56) References Cited

U.S. PATENT DOCUMENTS

| | | | |
|---|---|---|---|
| 3,906,937 A * | 9/1975 | Aronson | A61B 5/02141 600/493 |
| 4,133,616 A * | 1/1979 | Poirier | A61M 1/106 417/384 |
| 4,240,409 A * | 12/1980 | Robinson | A61M 1/106 128/DIG. 3 |
| 5,184,619 A | 2/1993 | Austin | |
| 5,289,827 A | 3/1994 | Orkin et al. | |
| 5,871,499 A | 2/1999 | Hahn et al. | |
| 6,440,089 B1 | 8/2002 | Shine | |
| 6,503,087 B1 | 1/2003 | Eggert et al. | |
| 7,226,420 B2 | 6/2007 | Machit et al. | |
| 2002/0173735 A1 * | 11/2002 | Lewis | A61H 9/0078 601/149 |
| 2005/0131307 A1 * | 6/2005 | Ruiter | G09B 23/28 600/485 |
| 2007/0088239 A1 * | 4/2007 | Roth | A61H 9/0078 601/152 |
| 2008/0138780 A1 | 6/2008 | Eggert et al. | |
| 2009/0005690 A1 | 1/2009 | Irland | |

(Continued)

*Primary Examiner* — Jason T Yen
(74) *Attorney, Agent, or Firm* — Durham Jones & Pinegar; Sarah W. Matthews; Christopher Wight (57) ABSTRACT A method and apparatus to simulate arterial blood pressure pulses to train clinicians in the use of oscillometric blood pressure monitors is described. The apparatus comprises a bladder or blood pressure cuff placed in a rigid enclosure with a known volume. The enclosure also has an opening, with a pressure plate placed between the opening and the bladder. An actuator, such as a servo motor with an arm, is attached to the outside of the enclosure next to the opening such that the arm of the servo motor or actuator may exert a force on the pressure plate, which in turn impinges the bladder. The bladder may be connected to a pressure sensor and an oscillometric blood pressure monitor. The force exerted by the actuator may be controlled in a feedback loop by a controller connected to the actuator and the pressure sensor.

20 Claims, 6 Drawing Sheets (56) References Cited

U.S. PATENT DOCUMENTS

| | | | |
|---|---|---|---|
| 2009/0011394 A1* | 1/2009 | Meglan | G09B 23/28 |
| | | | 434/268 |
| 2009/0148822 A1 | 6/2009 | Eggert et al. | |
| 2013/0289456 A1* | 10/2013 | Chang Guo | A61H 9/0078 |
| | | | 601/149 |
| 2014/0316314 A1* | 10/2014 | Schubert | A61H 9/0078 |
| | | | 601/149 |
| 2016/0361224 A1* | 12/2016 | Ramakrishna | A61H 9/0092 |

* cited by examiner

SYSTEM AND METHOD FOR SIMULATING ARTERIAL PRESSURE PULSES

FIELD OF INVENTION

This invention relates generally to blood pressure simulation systems and methods. It is particularly directed to a system and method for simulating arterial pressure pulses to train clinicians in the use of oscillometric blood pressure devices.

BACKGROUND

There are multiple methods of measuring arterial blood pressure using an inflated cuff on the arm or other appendage. The most common manual method used is the auscultation method. In this method, the clinician inflates a cuff around the arm to a pressure well above the expected arterial blood pressure. He or she then slowly deflates the cuff while listening with a stethoscope for sounds made by the return of blood flow in the artery. The pressure in the cuff corresponding to the first sounds in the artery corresponds to the systolic blood pressure and the pressure in the cuff corresponding to the departure of sounds from the artery is the diastolic blood pressure. While this method works well for manual measurement, it is impractical for automated non-invasive blood pressure measurement.

Figure 1:
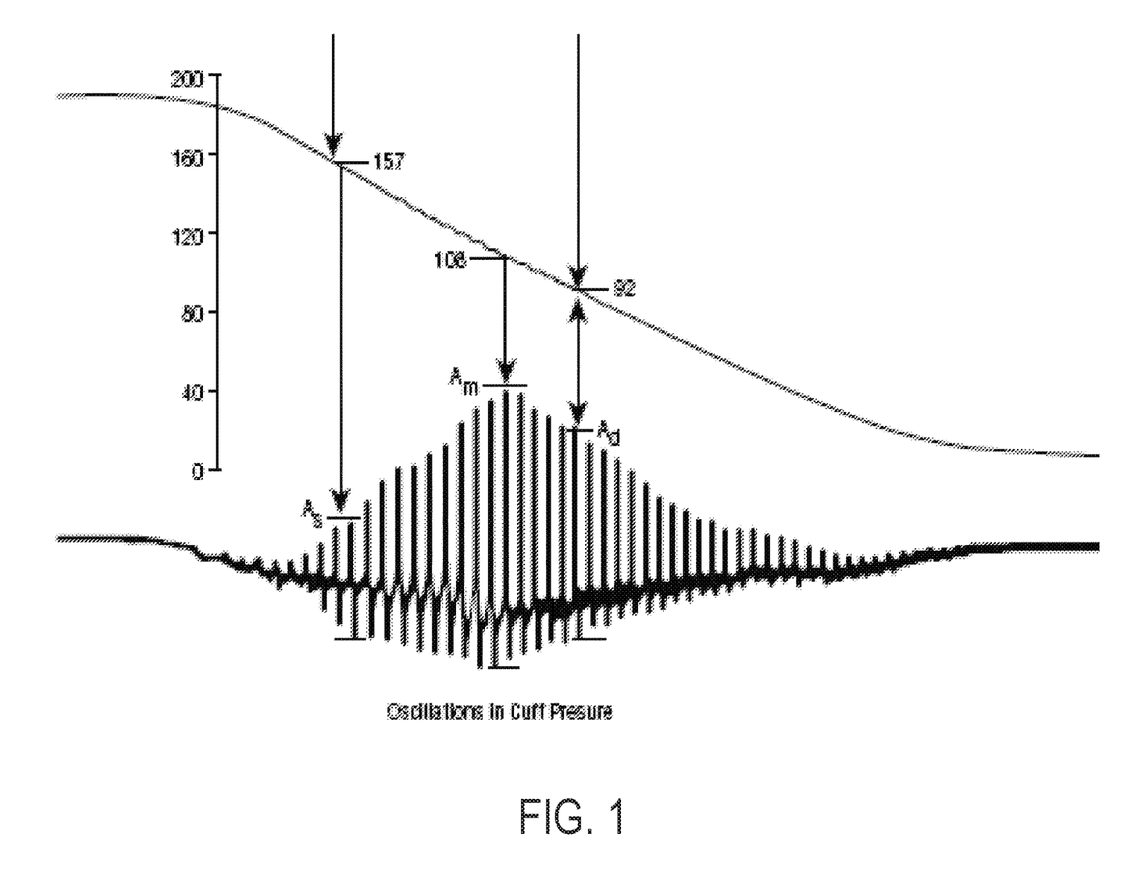
FIG. 1 shows a chart of pulse amplitudes, or oscillations in cuff pressure, as measured by an oscillometric blood pressure monitor known in the art.
Figure 2:
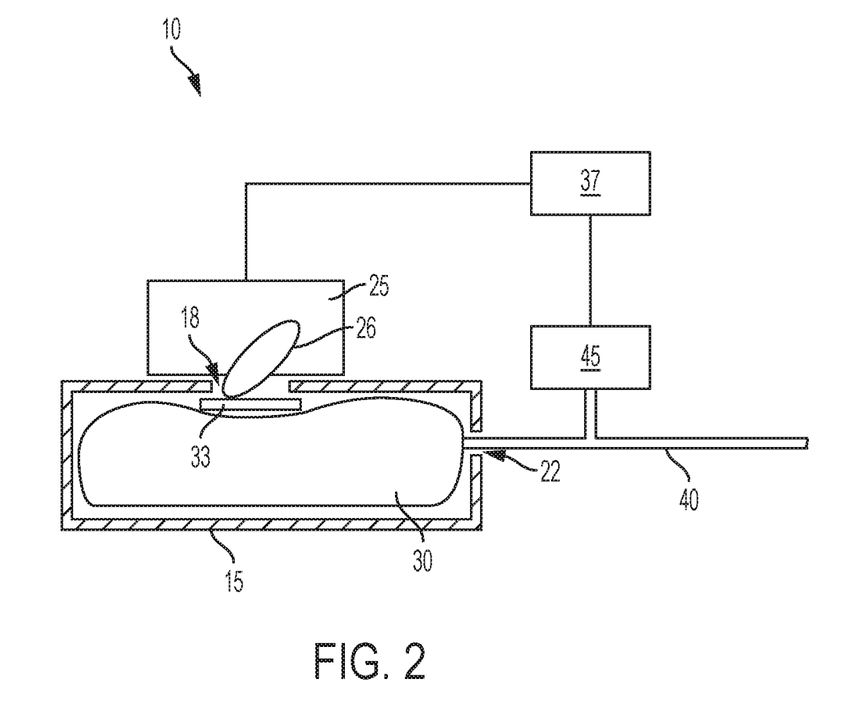
FIG. 2 is a side, cut-away view of a device that can be used to train clinicians in using oscillometric blood pressure monitoring.
Figure 3:
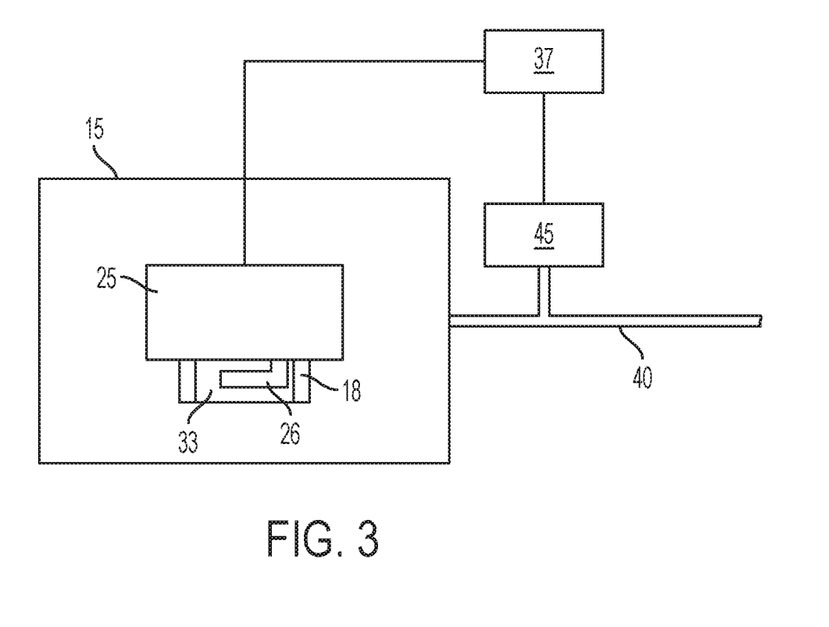
FIG. 3 is a top view of the device of FIG. 1.

Automated blood pressure measurement devices use the oscillometric method of blood pressure measurement. In this method, the blood pressure cuff is inflated and is deflated in pressure steps. At each pressure level, an electronic pressure sensor evaluates the relative amplitude of the pulses created by the artery under the cuff at that specific pressure level. By evaluating the relative pulse amplitude over a range of cuff pressure levels from well above the expected systolic pressure to well below the expected diastolic pressure, the automated monitor builds an array of pulse amplitudes. The system then evaluates the measured pulse amplitudes to calculate the systolic, diastolic and mean blood pressure values. The pressure where the maximum pulse amplitude is observed ($A_m$) is the mean blood pressure. The cuff pressure above the mean where the pulse amplitude is 50% of the maximum observed amplitude is taken as the systolic blood pressure (As) and the cuff pressure below the mean blood pressure where the pulse amplitude is 75% of the maximum observed pulse size is generally taken as the diastolic blood pressure (Ad), as shown in FIG. 1.

The oscillometric method assumes that the size of the measured pulses, or throbbing, is related to the blood pressure and that the maximum throbbing occurs when the cuff pressure matches the mean arterial pressure of the blood in the arteries under the cuff. Because this oscillometric blood pressure measurement method is easily automated it is built into many patient monitoring systems.

Clinicians commonly train for procedures such as taking a patient's blood pressure using the oscillometric method using a simulation. Most blood pressure simulation systems use actuators to drive a piston to create simulated blood pressure pulses within the tubing connecting the blood pressure cuff to the monitor, rather than impinging the blood pressure cuff directly. Since these systems do not control the volume of the cuff, they are limited in the range of blood pressures they can simulate and the accuracy of the simulation. Depending on the volume of the cuff inflation these actuator systems may not be able to create the simulated arterial pulses needed to generate the correct simulated blood pressure values.

Thus, clinicians are not able to practice using a simulation that accurately trains on the fully range of blood pressure values that the clinician may see in clinical practice.

Consequently, there is a long felt need for a technology that could more accurately simulate the clinical experience of using oscillometric blood pressure measurement across a broad range of values.

SUMMARY

This present disclosure relates to apparatuses, methods, and systems for training clinicians in the use of blood pressure devices. Disclosed herein is a device for simulating arterial pressure pulses, the device comprising: an enclosure having an opening for a blood pressure cuff tube and an opening for an actuator, wherein the enclosure has an enclosure volume; a bladder configured to be housed in the enclosure, the bladder having a maximum volume greater than the enclosure volume; a tube fluidly connected to the bladder and extending through the blood pressure cuff opening, wherein the tube is in communication with a pressure sensor; and an actuator in proximity to the enclosure configured to reversibly exert a force on the bladder to simulate a pulse.

The device may further comprise a controller in communication with the pressure sensor and the actuator. The tube may be connected to an oscillometric blood pressure monitor. In some configurations, the actuator comprises a servo motor having an arm with a foot.

The actuator may be connected to an exterior wall of the enclosure or otherwise placed in proximity to the opening for the bladder. In some configurations, the device may also include a pressure plate between the bladder and the actuator opening.

In some configurations, the pressure sensor may be configured to measure a first pressure reading indicative of the pressure within the bladder before the actuator exerts the force on the bladder, and a second pressure reading indicative of the pressure within the bladder after the actuator exerts the force on the bladder.

The controller may also be programmed to use the first pressure reading to determine a pulse pressure needed to achieve a simulated pulse amplitude. The controller may be further programmed to compare the second pressure reading to the pulse pressure and when the controller determines the second pressure reading is less than the pulse pressure, the controller is further programmed to communicate a signal to the actuator to increment the force on the bladder. The balder may comprise a blood pressure cuff, either a reusable cuff or a disposable cuff.

Disclosed herein is a method for simulating arterial pressure pulses, the method comprising: selecting a device, the device comprising: an enclosure having comprising a blood pressure cuff opening and an actuator opening, wherein the enclosure has an enclosure volume; a bladder configured to be housed in the enclosure, the bladder having a maximum volume greater than the enclosure volume; a tube fluidly connected to the bladder and extending through the blood pressure cuff opening, wherein the tube is in communication with a pressure sensor; a pressure plate between the bladder and the actuator opening; and an actuator connected to an exterior of the enclosure and configured to reversibly exert a force on the pressure plate to simulate a pulse; and attaching the device to an oscillometric blood pressure monitor.

The method may further comprise connecting the actuator of the device and the pressure sensor of the device to a controller. In other examples, the method may further comprise the pressure sensor measuring a first pressure reading of the bladder before the actuator exerts the force on the pressure plate. The method may also comprise the controller determining a pulse pressure needed to achieve a simulated pulse amplitude based on the first pressure reading. The method may also comprise the step of the actuator exerting a force on the pressure plate.

In some configurations, the method may further comprise the step of the pressure sensor measuring a second pressure reading of the bladder after the actuator exerts the force on the pressure plate. The controller may receive the second pressure reading and compare the second pressure reading to the pulse pressure, and when the controller determines the second pressure reading is less than the pulse pressure, the controller communicating a signal to the actuator to increment the force on the pressure plate.

According to another aspect, a kit is described, the kit comprising: an enclosure having a blood pressure cuff opening and an actuator opening, a tube configured to be fluidly connected to a bladder and extend through the blood pressure cuff opening; a pressure sensor configured to be in fluid communication with the tube; an actuator configured to reversibly exert a force on a bladder to simulate a pulse; and a controller configured to be in communication with the pressure sensor and actuator.

The kit may further comprise a housing, the housing configured to hold the enclosure, the tube, the pressure sensor, the actuator, and the controller, and wherein the enclosure comprises the bladder. The enclosure may have an enclosure volume, and further comprising the bladder configured to be housed in the enclosure, the bladder having a maximum volume greater than the enclosure volume.

The kit may further comprise software to program a controller to receive pressure readings from the pressure sensor and send signals to the actuator.

BRIEF DESCRIPTION OF THE DRAWINGS

The following drawings illustrate what are currently considered to be specific configurations for carrying out the invention.

DETAILED DESCRIPTION

Reference will now be made to the drawings in which the various elements of the illustrated configurations will be given numerical designations and in which the invention will be discussed so as to enable one skilled in the art to make and use the invention. It is to be understood that the following description is only exemplary of the principles of the present invention, and should not be viewed as narrowing the claims which follow.

Definitions

The term "bladder" means any deformable sack or container capable of being filled with air. For example, bladder encompasses a standard cuff of a blood pressure monitor. Reusable blood pressure cuffs may comprise a bladder housed within an outer layer, while disposable cuffs comprise just a bladder. Any suitable bladder or blood pressure cuff, whether reusable or disposable, may be used, and as used herein, "bladder" and "cuff" mean both reusable and disposable blood pressure cuffs. In some configurations, a disposable blood pressure cuff, such as those manufactured by Medline Industries, may be used.

The term "actuator" means any electromechanical device that may be used to exert a force. For example, a servo motor with an arm that is rotatable, a linear servo motor, a variable solenoid with shaft, a gear motor with a rotating shaft, etc. The arm of the actuator may also comprise a foot in some configurations.

The term "baseline pressure reading" or "first pressure reading" means the pressure that is measured by the pressure sensor before a force is exerted by the actuator. This pressure is typically primarily caused by inflation of the bladder or cuff by, for example, the oscillometric blood pressure monitor as it inflates and deflates the bladder or cuff step-wise. This first pressure reading may be used by the controller to determine a pulse pressure needed to achieve a simulated pulse amplitude.

The term "second pressure reading" means the pressure that is measured by the pressure sensor after a force is exerted by the actuator. This second pressure reading may be used by the controller to determine if the pulse pressure has been achieved.

The term "pulse pressure" means the desired pressure to be achieved, as measured by the pressure sensor, after the actuator exerts a force on the pressure plate. The pulse pressure may be controlled by the controller using a feedback loop, wherein the controller determines the pulse pressure needed to achieve a simulated pulse amplitude, sends a signal to the actuator to exert a force on the pressure plate, and then received the pulse pressure from the pressure sensor. If the pulse pressure is not great enough, the controller may then send another signal to the actuator to exert a greater force on the pressure plate, and then receive the pulse pressure from the pressure sensor, etc., until the pulse pressure needed to achieve the simulated pulse amplitude is achieved.

The term "simulated pulse amplitude" means the amplitude of the pulse on the bladder caused by the force exerted on the bladder by the actuator.

The term "tubing" or "tube" means tubing or any other mechanism capable of fluidly connecting two or more pneumatic components. For example, tubing as used herein comprises tubing such as plastic tubing, a pipe, a manifold, a sealed box with ports to connect various components, etc.

The term "enclosure" means a housing, frame, casing, shell, container, or other structure capable of holding the bladder described herein. The enclosure may have a known volume less than the maximum volume of the bladder, such that when the bladder is inflated to the fullest extent possible in the enclosure, the bladder volume would be limited by the volume of the enclosure. The enclosure may also have one or more openings to allow an actuator to impinge the bladder within the enclosure, and/or allow tubing to be connected to the bladder within the enclosure to fluidly connect the bladder to other pneumatic elements.

The term "controller" means a standard controller, typically equipped with a processor, control unit, a logic unit, a memory, etc. The controller may be a separate controller designed specifically for use with the device, or the controller may be a standard computing device, etc.

A side, cut-away of the apparatus for simulating arterial pulses in a bladder, generally indicated at 10, is shown in FIG. 1. In clinical practice, the apparatus may be used as-is, or may be mounted on a manikin, such as on the arm or other appendage. The apparatus may generally consist of an enclosure 15 with an actuator opening 18 on the top surface, a blood pressure cuff opening 22 on a side of the enclosure, a bladder or cuff 30 within the enclosure, an actuator 25 connected to the exterior of the enclosure, a pressure plate 33 between the bladder 30 and the actuator opening 18, and a tube 40 connecting the bladder to a pressure sensor 45 and an oscillometric blood pressure monitor 47. The actuator opening 18 may allow an actuator 25 on the exterior of the enclosure to impinge a bladder 30 within the enclosure. A bladder 30 may be housed in the enclosure 15. The blood pressure cuff opening 22 may allow the bladder to be connected to an oscillometric blood pressure monitor (not shown in FIG. 1). In some configurations, the bladder 30 may be the cuff of an oscillometric blood pressure monitor. The maximum volume of the bladder or cuff 30 may be larger than the volume of the enclosure 15 such that the volume of the cuff when fully inflated in the enclosure is known and limited by the volume of the enclosure.

The enclosure 15 may be formed of any suitable material, such as plastic or another semi-rigid or rigid material. It will be appreciated that while the pressure sensor, controller, etc. are shown outside the enclosure 15 in FIG. 1, in some configurations these structures could be housed within the enclosure 15, attached to the outside of the enclosure, etc.

Between the bladder 30 and the actuator opening 18 may be a pressure plate 33. The pressure plate 33 may be sized such that it is retained inside the enclosure, and in some configurations may be flexibly attached to the interior of the enclosure to hold it in place. The pressure plate 33 may be any suitable shape and size. For example, the pressure plate may be about 0.5 square centimeters to about 2.0 square centimeters depending on the volume of the enclosure. For example, a pediatric cuff or bladder would be enclosed in an enclosure with a smaller volume and could achieve the pressure changes necessary using a smaller pressure plate. In other configurations, a pressure plate may not be included. Rather, the actuator may include a foot on the end of the arm, the footprint of the foot being approximately the size of the pressure plate (see FIG. 6, actuator 25 including an arm 26 with a foot 55). In other configurations, a foot and a pressure plate may be used.

An actuator 25 may be attached to the exterior of the enclosure, proximate to the actuator opening 18. This may allow the actuator, or a portion of the actuator, to pass into the enclosure through the actuator opening 18 and exert a force on the pressure plate 33 (and thus simulate a pulse on the bladder). The actuator 25 may be configured to reversibly exert a force on the pressure plate 33 to simulate an arterial pulse. The actuator 25 may be any suitable electromechanical device capable of exerting a force. For example, a servo motor with an arm that is rotatable to press down on pressure plate 33 may be used. Similarly, a linear servo motor could be used, a variable solenoid with a shaft to press down on pressure plate 33, a gear motor with a rotating shaft to press down on pressure plate 33, etc. The actuator 25 may be connected, either wirelessly or otherwise, to a controller 37. The controller 37 may send signals to the actuator to engage the actuator, and to increment the force the actuator applies to the pressure plate as described below.

The bladder 20 may be connected to a tube 40 that may fluidly connect the bladder to a pressure sensor 45 and an oscillometric blood pressure monitor (not shown in FIG. 1). The tube 40 may be fluidly connected to the bladder and extend through the blood pressure cuff opening 22 in the side of the enclosure. The pressure sensor 45, like the actuator 25, may be connected to the controller 37 (either via a wired connection or wirelessly). The pressure sensor 45 may be configured to take a first pressure reading before the actuator exerts a force, and a second reading after the actuator exerts a force. The first pressure reading may be received by the controller and used to determine a pulse pressure needed to achieve a specific, predetermined simulated pulse amplitude. The second pressure reading may be compared to the pulse pressure to determine if the pulse pressure has been achieved. The pressure sensor 45 may be an integral part of the oscillometric blood pressure monitor 47, or a separate pressure sensor 45 may be provided. In a configuration with the pressure sensor 45 formed as an integral part of the oscillometric blood pressure monitor 47, a separate pressure sensor would not be necessary.

The bladder 20 may be selectively inflated via an oscillometric blood pressure monitor. The bladder 20 may be pressurized at different levels by the blood pressure monitor to determine the systolic pressure, mean arterial pressure, and/or diastolic pressure. As the bladder 20 is inflated and deflated step-wise, the force exerted by the actuator on the pressure plate to deform the bladder to achieve a predetermined pulse amplitude at the blood pressure monitor changes.

A standard oscillometric blood pressure monitor may be used. The bladder 20 may either be a customized bladder, or the standard cuff of an oscillometric blood pressure monitor. The bladder or cuff 20 is inflated and deflated at pressure steps. The actuator 25 impinges on the cuff through the actuator opening 18 in the enclosure 15 to create the simulated blood arterial pulses. The force of the actuator controls the pulse amplitude that is observed for a specific baseline pressure and actuator stroke. By constraining the bladder or cuff to a specific volume (the volume of the enclosure), the pulse amplitude at each pressure can be tightly controlled in a repeatable manner leading to consistent accurate blood pressure simulation.

At each step, the pressure sensor 45 takes a first pressure reading to determine the pressure of the cuff. Computer software, consisting of executable code of machine language instructions to the controller 37 may control the actuator to simulate the correct blood pressure reading. This first pressure reading is received by the controller (100), as shown in the controller logic of FIG. 4. The controller 37 may then use this first pressure reading (or baseline cuff pressure) to determine the pulse pressure needed to achieve a simulated pulse amplitude (105) (method for determined pulse pressure described below).

Figure 4:
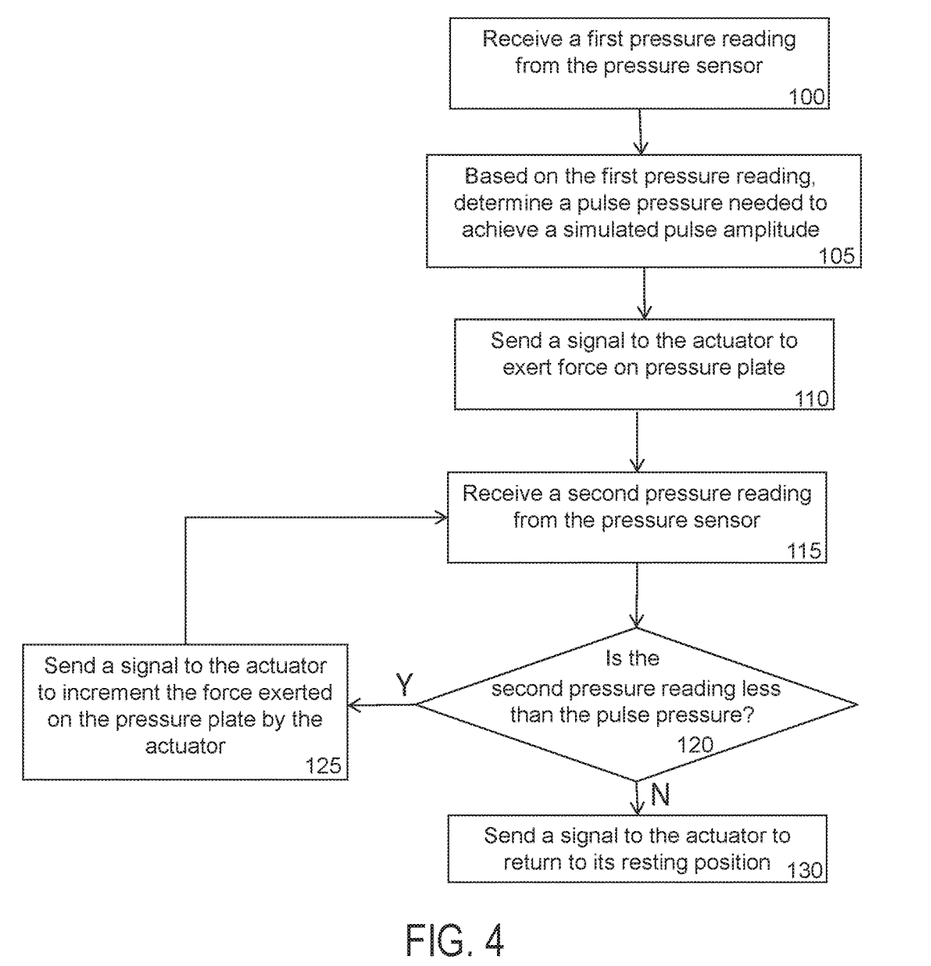
FIG. 4 shows one example of logic that may be used on a controller of the device shown in FIGS. 2 and 3.

The controller 37 then sends a signal to the actuator 25 to impinge the cuff or bladder 30 by placing a force on the pressure plate 33 (110). The pressure sensor may then measure a second pressure reading to determine the pressure of the cuff or bladder after a force is exerted by the actuator. To achieve the desired simulated pulse amplitude (measured at the electronic pressure sensor of the oscillometric blood pressure monitor), the pulse pressure must be reached within the bladder 30. To reach the pressure pulse, the controller may be programmed to execute a feedback loop consisting of receiving the second pressure reading (115), determining if the second pressure reading is less than the pulse pressure (120), and where the second pressure reading is less than the pulse pressure, sending a signal to the actuator to increment the force exerted on the pressure plate (125). Once the second pressure reading is not less than the pulse pressure, the controller may signal the actuator to return to its resting position (130).

The measure and adjust loop (consisting of receiving the second pressure reading (115), determining if the second pressure reading is less than the pulse pressure (120), and where the second pressure reading is less than the pulse pressure, sending a signal to the actuator to increment the force exerted on the pressure plate (125)) may be executed at predetermined time intervals. Smaller time intervals allow the simulation to be more accurate. For example, the loop may be completed once every 10 milliseconds, or 100 times per second. The entire pulse simulation for each heart beat maybe completed in less than 300 milliseconds to accurately mimic an arterial pulse.

The bladder may be connected to a standard oscillometric blood pressure monitor, and the pressure pulses sensed by the monitor at each pressure level may be used by the monitor to calculate the blood pressure. At each step-wise pressure level, an electronic pressure sensor in the oscillometric blood pressure monitor evaluates the relative amplitude of the pulses created by the actuator impinging the cuff.

The software may be programmed to determine the simulated pulse amplitude needed at each cuff pressure level. The simulated pulse amplitude may be calculated based on the function shown in FIG. 5. The software may either calculate each simulated amplitude based on the function, or may be programmed with look-up tables based on the given first pressure reading and the desired simulated pulse amplitude. To simulate a specific blood pressure, a mathematical function may be used that defines the amplitude of the simulated arterial pulses for each first pressure reading, or baseline cuff pressure. The function places the largest pulse amplitude at the mean arterial blood pressure to be simulated. The amplitude of the simulated pulses decreases linearly as a function of the difference between the simulated mean pressure and the measured cuff pressure. The slope of the line defining pulse amplitudes for cuff pressures that are less than the mean pressure is selected such that amplitude of the pulses at the simulated diastolic pressure is 75% of the amplitudes at the mean pressure. The slope of the line defining pulse amplitudes for pressures greater than the mean pressure is selected so that the pulse amplitude at the simulated systolic pressure is 50% of the amplitude of the pulses at the simulated mean pressure.

Figure 5:
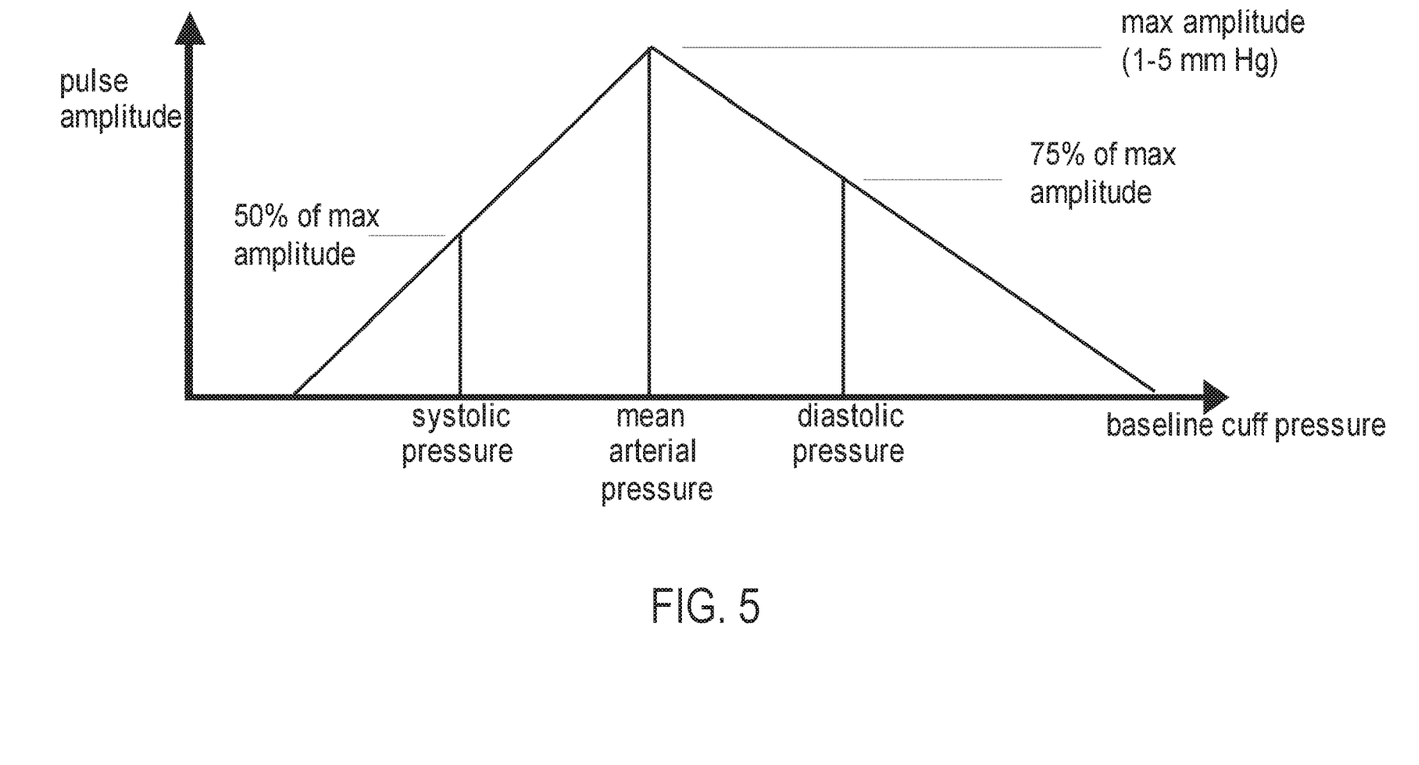
FIG. 5 shows a function that may be used to determine a pulse pressure.

The following equations may be derived from the function shown in FIG. 5:

If pressure = mean _pressure
    Pulse _Amplitude = max_amplitude
else if pressure < mean pressure
    Pulse_amplitude =
        max_amplitude*[1.0−0.25*((mean_pressure−
    cuff_pressure)/(mean_pressure−diastolic_pressure))]
else if pressure > mean blood pressure
    Pulse_amplitude =
        max_amplitude*[1.0−0.5*((cuff_pressure−
    mean_pressure)/(systolic_pressure−mean_pressure))]
where:
    max_amplitude is the largest pulse amplitude or the pulse amplitude at
mean blood pressure;
    mean_pressure is the simulated mean arterial blood pressure;
    systolic_pressure is the simulated systolic arterial blood pressure;
    diastolic_pressure is the simulated diastolic arterial blood pressure; and
    cuff pressure is the measured pressure in the blood pressure cuff Note that if the calculated pulse amplitude is less than zero, then no pulse (zero amplitude) is simulated.

The baseline cuff pressure is the first pressure reading the controller may receive from the pressure sensor before a force is exerted on the cuff or bladder by the actuator. Desired maximum amplitude at the mean arterial pressure may range from about 1 to about 5 mm Hg.

The various aspects of a device as described herein may be sold as formed, single unit, or a kit may be provided that includes pieces of the device that may be connected later by a clinician. For example, a kit may contain an enclosure with an actuator, a pressure plate, a pressure sensor, and a tube designed to connect a standard blood pressure cuff to the pressure sensor. The kit may be used with a standard oscillometric blood pressure cuff and blood pressure monitor. The kit may also use a standard computing device, and may further include software necessary for the standard computing device to communicate with the actuator and pressure sensor (or such software may be downloaded without being physically included in the kit).

Figure 6:
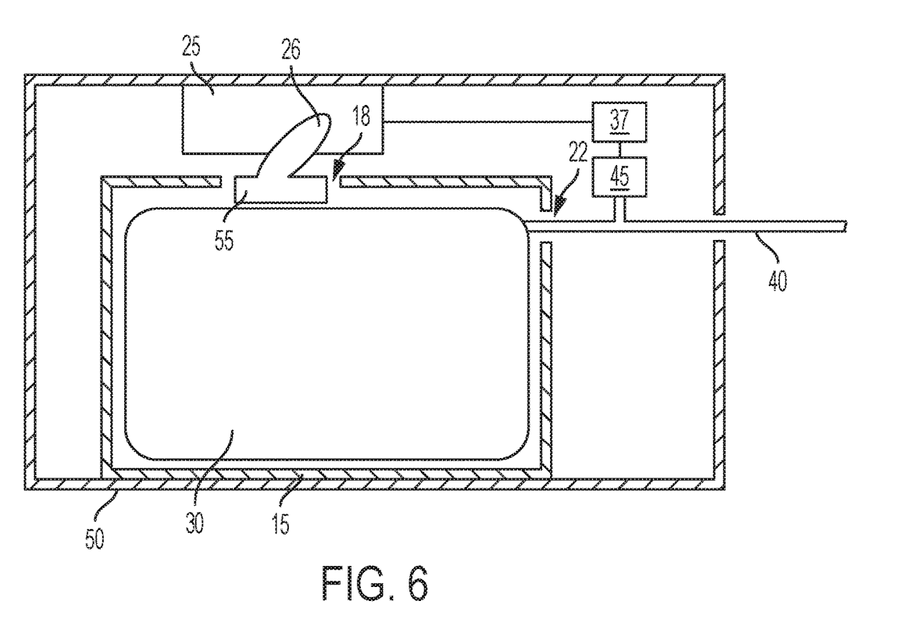
FIG. 6 is a side, partial cut-away view of another configuration of a device that can be used to train clinicians in using oscillometric blood pressure monitoring.

The system for simulating arterial pressure pulses may also be sold as a subsystem of a complete vital signs simulation system. For example, FIG. 6 shows the enclosure 15 as it may be encased in a larger housing 50, the larger housing also holding the cuff or bladder 30, actuator 25, pressure sensor 45 and processor 37. In this configuration, the cuff or bladder 30 may be installed in the enclosure at the time the system is fabricated and would be replaced by a qualified service technician. The processor 37 may also be configured to be in communication (either wired or wirelessly) with additional systems for simulation. For example, the processor 27 may be in communication with a commercial patient monitor, such as those used in clinical practice.

FIG. 6 also shows an alternate configuration wherein the actuator 25 is not attached to the enclosure 15, but rather is located proximate to the actuator opening 18 of the enclosure 15. For example, the actuator 25 may be mounted to the larger housing 50 proximate to the actuator opening 18 of the enclosure 15. This configuration also shows an actuator 25 equipped with an arm 26 comprising a foot 55 at the end of the arm 26. The foot 55 may serve to selectively put pressure on the bladder 30 without the need for a pressure plate. The foot 55 may have a footprint, for example, approximately equal to the size of the pressure plate.

While the invention has been described in particular with reference to certain illustrated configurations, such is not intended to limit the scope of the invention. The present invention may be embodied in other specific forms without departing from its spirit or essential characteristics. The described configurations are to be considered as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A device for simulating arterial pressure pulses, the device comprising:
    a rigid enclosure having an opening for a blood pressure cuff tube and an opening for an actuator, wherein the rigid enclosure has a fixed enclosure volume;

a bladder configured to be housed in the rigid enclosure, the bladder having a maximum volume greater than the fixed enclosure volume;

a tube connected to the bladder and extending through the blood pressure cuff opening, wherein the tube is in communication with a pressure sensor; and an actuator in proximity to the rigid enclosure configured to reversibly exert a force on the bladder to simulate a pulse.

2. The device of claim 1, further comprising a controller in communication with the pressure sensor and the actuator.

3. The device of claim 1, wherein the tube is connected to an oscillometric blood pressure monitor.

4. The device of claim 1, wherein the actuator comprises a servo motor having an arm with a foot.

5. The device of claim 2, wherein the pressure sensor is configured to measure a first pressure reading indicative of the pressure within the bladder before the actuator exerts the force on the bladder, and a second pressure reading indicative of the pressure within the bladder after the actuator exerts the force on the bladder.

6. The device of claim 5, wherein the controller is programmed to use the first pressure reading to determine a pulse pressure needed to achieve a simulated pulse amplitude.

7. The device of claim 6, wherein the controller is further programmed to compare the second pressure reading to the pulse pressure and when the controller determines the second pressure reading is less than the pulse pressure, the controller is further programmed to communicate a signal to the actuator to increment the force on the bladder.

8. The device of claim 1, wherein the bladder comprises a blood pressure cuff.

9. The device of claim 1, wherein the actuator is connected to an exterior wall of the enclosure.

10. The device of claim 1, further comprising a pressure plate between the bladder and the actuator opening.

11. A method for simulating arterial pressure pulses, the method comprising:

selecting a device, the device comprising:
a rigid enclosure having comprising a blood pressure cuff opening and an actuator opening, wherein the rigid enclosure has a fixed enclosure volume;
a bladder configured to be housed in the rigid enclosure, the bladder having a maximum volume greater than the fixed enclosure volume;
a tube connected to the bladder and extending through the blood pressure cuff opening, wherein the tube is in communication with a pressure sensor;
a pressure plate between the bladder and the actuator opening; and
an actuator connected to an exterior of the rigid enclosure and configured to reversibly exert a force on the pressure plate to simulate a pulse; and attaching the device to an oscillometric blood pressure monitor.

12. The method of claim 11, wherein the method further comprises connecting the actuator of the device and the pressure sensor of the device to a controller.

13. The method of claim 12, wherein the method further comprises the pressure sensor measuring a first pressure reading of the bladder before the actuator exerts the force on the pressure plate.

14. The method of claim 13, wherein the method further comprises the controller determining a pulse pressure needed to achieve a simulated pulse amplitude based on the first pressure reading.

15. The method of claim 14, further comprising the step of the actuator exerting a force on the pressure plate.

16. The method of claim 15, further comprising the step of the pressure sensor measuring a second pressure reading of the bladder after the actuator exerts the force on the pressure plate.

17. The method of claim 16, further comprising the controller receiving the second pressure reading and comparing the second pressure reading to the pulse pressure, and when the controller determines the second pressure reading is less than the pulse pressure, the controller communicating a signal to the actuator to increment the force on the pressure plate.

18. A kit for a device to simulate arterial pressure pulses, the kit comprising:

a rigid housing having a fixed volume, the housing configured to hold a bladder, a tube, a pressure sensor, an actuator, and a controller;
the housing having a blood pressure cuff opening and an actuator opening,
the tube configured to be connected to a bladder and extend through the blood pressure cuff opening;
the pressure sensor configured to be in communication with the tube;
the actuator configured to reversibly exert a force on the bladder to simulate a pulse; and
the controller configured to be in communication with the pressure sensor and actuator.

19. The kit of claim 18, wherein the bladder has a maximum volume greater than the fixed volume of the housing.

20. The kit of claim 19, further comprising software to program a controller to receive pressure readings from the pressure sensor and send signals to the actuator.

* * * * *